US012671622B2

(12) United States Patent
Dallaire et al.

(10) Patent No.: US 12,671,622 B2
(45) Date of Patent: Jun. 30, 2026

(54) ADAPTIVE NETWORK TRACE ANALYSIS USING REFERENCE COMMUNICATION FLOWS

(71) Applicant: B.yond, Inc., Redmond, WA (US)

(72) Inventors: Martin Dallaire, Montreal (CA); Lucas Federico Ledesma, Cordoba (AR); Pierre Moufarrege, Montreal (CA); Albert Khoury Aouad, Ottawa (CA); Charles Abondo, Nuns Island (CA); Nathanael Weill, Cote Saint Luc (CA)

(73) Assignee: B.yond, Inc., Redmond, WA (US)

( * ) Notice: Subject to any disclaimer, the term of this patent is extended or adjusted under 35 U.S.C. 154(b) by 0 days.

(21) Appl. No.: 18/799,474

(22) Filed: Aug. 9, 2024

(65) Prior Publication Data

US 2026/0046193 A1    Feb. 12, 2026

(51) Int. Cl.
  *H04L 41/0631*      (2022.01)
  *H04L 41/14*       (2022.01)
  *H04L 43/045*      (2022.01)
(52) U.S. Cl.
  CPC .......... *H04L 41/0631* (2013.01); *H04L 41/14* (2013.01); *H04L 43/045* (2013.01)
(58) Field of Classification Search
  None
  See application file for complete search history.

(56) References Cited

U.S. PATENT DOCUMENTS 8,682,812 B1    3/2014  Ranjan
2013/0073573 A1   3/2013  Huang et al.

2013/0163427 A1   6/2013  Beliveau et al.
2013/0219057 A1   8/2013  Li et al.
2014/0129700 A1   5/2014  Mehta et al.
(Continued)

FOREIGN PATENT DOCUMENTS

WO    WO-2020175165 A1 *  9/2020  ............... G06N 3/09

OTHER PUBLICATIONS

International Search Report of PCT/US2025/027646 mailed on Jul. 3, 2025.

(Continued)

*Primary Examiner* — Lance Leonard Barry
(74) *Attorney, Agent, or Firm* — WTA IP Law P.C.

(57)                ABSTRACT

Embodiments relate to storing and updating reference communication flows as a reference dataset for comparison against a query communication flow to perform a network trace analysis. Reference data set, reference communication flows, and corresponding features and labels are stored. Network packets are preprocessed and correlated. The features are extracted from the correlated network packets. A subset of the reference dataset having greatest similarity to the query communication flow and the features of the query communication flow are determined. The candidate labels and information indicating likelihood of the candidate labels being correct is determined by comparing the subset of the reference dataset with the query communication flow. Feedback based on these predictions is received and used for updating the reference dataset adaptively. This approach reduces time-consuming manual operations in network trace analysis while continuously improving predictions based on the feedback.

17 Claims, 9 Drawing Sheets

(56) References Cited

U.S. PATENT DOCUMENTS

| | | |
|---|---|---|
| 2016/0308766 A1 | 10/2016 | Register et al. |
| 2017/0091204 A1 | 3/2017 | Minwalla et al. |
| 2018/0034738 A1 | 2/2018 | Zsohar et al. |
| 2018/0343238 A1 | 11/2018 | Tola |
| 2019/0260683 A1 | 8/2019 | Silver |
| 2019/0294995 A1* | 9/2019 | Pastor Perales ....... G06N 20/00 |
| 2021/0367871 A1 | 11/2021 | Musa |
| 2023/0289444 A1* | 9/2023 | Ermey .................. G06F 21/552 |
| 2025/0097127 A1* | 3/2025 | Stein ..................... H04L 43/026 |
| 2025/0166018 A1* | 5/2025 | Woodruff, III ..... H04L 43/0894 |

OTHER PUBLICATIONS

Written Opinion of PCT/US2025/027646 mailed on Jul. 3, 2025.
Ibrahim et al. "Entropy-based network traffic anomaly classification method resilient to deception." Computer Science and Information Systems 19.I (2022): 87-116. Retrieved on Jun. 23, 2025 (Jun. 23, 2025) from <https://doiserbia.nb.rs/img/doi/1820-0214/2022/1820-021421000451.pdf>.
Sperotto et al. "A labeled data set for flow-based intrusion detection." IP Operations and Management: 9th IEEE International Workshop, IPOM 2009, Venice, Italy, Oct. 29-30, 2009. Proceedings 9. Springer Berlin Heidelberg, 2009. Retrieved on Jun. 23, 2025 (Jun. 23, 2025) from <https://ris.utwente.nl/ws/portalfiles/portal/5324404/tracelabel_Incs.pdf>.

* cited by examiner

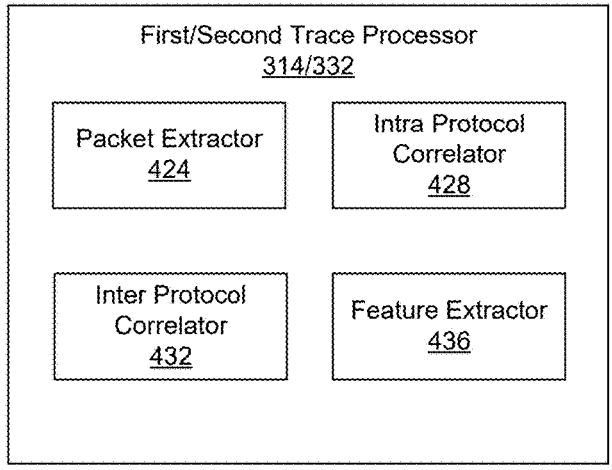

First/Second Trace Processor
314/332

Packet Extractor
424

Intra Protocol
Correlator
428

Inter Protocol
Correlator
432

Feature Extractor
436

FIG. 4

| Line | Reference Communication Flow | Query Communication Flow |
|------|------------------------------|--------------------------|
| 1 | invite_ue_pcscf | invite_ue_pcscf |
| 2 | invite_scscf_tas | invite_scscf_tas |
| 3 | prack_ue_pcscf | prack_ue_pcscf |
| 4 | prack_scscf_tas | prack_scscf_tas |
| 5 | bye_ue_pcscf | ack_ue_pcscf |
| 6 | bye_scscf_tas | ack_scscf_tas |
| 7 | prack_ue_pcscf | bye_ue_pcscf |
| 8 | prack_scscf_tas | bye_scscf_tas |
| 9 | ack_ue_pcscf | |
| 10 | ack_scscf_tas | |
| 11 | bye_tas_scscf | |
| 12 | bye_pcscf_ue | |

FIG. 5A

| Line | Reference Communication Flow | Edit operation | Query Communication Flow |
|------|------------------------------|----------------|--------------------------|
| 1 | invite_ue_pcscf | | invite_ue_pcscf |
| 2 | invite_scscf_tas | | invite_scscf_tas |
| 3 | prack_ue_pcscf | | prack_ue_pcscf |
| 4 | prack_scscf_tas | | prack_scscf_tas |
| 5 | bye_ue_pcscf | DELETE | |
| 6 | bye_scscf_tas | DELETE | |
| 7 | prack_ue_pcscf | DELETE | |
| 8 | prack_scscf_tas | DELETE | |
| 9 | ack_ue_pcscf | | ack_ue_pcscf |
| 10 | ack_scscf_tas | | ack_scscf_tas |
| 11 | bye_tas_scscf | SUBSTITUTE | bye_ue_pcscf |
| 12 | bye_pcscf_ue | SUBSTITUTE | bye_scscf_tas |

FIG. 5B

| Line | Reference Communication Flow | Failure Indication | Edit Operation | Query Communication Flow | Failure Indication |
|------|------------------------------|--------------------|----------------|--------------------------|--------------------|
| 1 | invite_ue_pcscf | | | invite_ue_pcscf | |
| 2 | invite_scscf_tas | | | invite_scscf_tas | |
| 3 | prack_ue_pcscf | | | prack_ue_pcscf | |
| 4 | prack_scscf_tas | | | prack_scscf_tas | |
| 5 | bye_ue_pcscf | 108-New Dialog Established | DELETE | | |
| 6 | bye_scscf_tas | 108-New Dialog Established | DELETE | | |
| 7 | prack_ue_pcscf | | DELETE | | |
| 8 | prack_scscf_tas | | DELETE | | |
| 9 | ack_ue_pcscf | | | ack_ue_pcscf | |
| 10 | ack_scscf_tas | | | ack_scscf_tas | |
| 11 | bye_tas_scscf | 16-tui system disconnect | SUBSTITUTE | bye_ue_pcscf | User Triggered |
| 12 | bye_pcscf_ue | 16-tui system disconnect | SUBSTITUTE | bye_scscf_tas | User Triggered |

FIG. 5C

| Line | Reference Communication Flow | Failure Indication | Edit Operation | Query Communication Flow | Failure Indication |
|---|---|---|---|---|---|
| 1 | invite_ue_pcscf | Request Terminated | SUBSTITUTE | invite_ue_pcscf | Database Lookup Failure |
| 2 | invite_scscf_tas | Request Terminated | SUBSTITUTE | invite_scscf_tas | Database Lookup Failure |
| 3 | prack_ue_pcscf | | | prack_ue_pcscf | |
| 4 | prack_scscf_tas | | | prack_scscf_tas | |
| 5 | bye_ue_pcscf | | | | |
| 6 | bye_scscf_tas | | | | |
| 7 | prack_ue_pcscf | | | | |
| 8 | prack_scscf_tas | | | | |
| 9 | ack_ue_pcscf | | | ack_ue_pcscf | |
| 10 | ack_scscf_tas | | | ack_scscf_tas | |
| 11 | bye_tas_scscf | 16-tui system disconnect | | bye_ue_pcscf | 16-tui system disconnect |
| 12 | bye_pcscf_ue | 16-tui system disconnect | | bye_scscf_tas | 16-tui system disconnect |
| 13 | LABEL | Request Terminated (scscf-tas) | | LABEL PREDICTED: | Unable to find match for reference label |

FIG. 6A

| Line | Reference Communication Flow | Failure Indication | Edit Operation | Query Communication Flow | Failure Indication |
|---|---|---|---|---|---|
| 1 | invite_ue_pcscf | Request Terminated | SUBSTITUTE-GENERIC | invite_ue_pcscf | Database Lookup Failure |
| 2 | invite_scscf_tas | Request Terminated | SUBSTITUTE-GENERIC | invite_scscf_tas | Database Lookup Failure |
| 3 | prack_ue_pcscf | | | prack_ue_pcscf | |
| 4 | prack_scscf_tas | | | prack_scscf_tas | |
| 5 | bye_ue_pcscf | | | bye_ue_pcscf | |
| 6 | bye_scscf_tas | | | bye_scscf_tas | |
| 7 | prack_ue_pcscf | | | prack_ue_pcscf | |
| 8 | prack_scscf_tas | | | prack_scscf_tas | |
| 9 | ack_ue_pcscf | | | ack_ue_pcscf | |
| 10 | ack_scscf_tas | | | ack_scscf_tas | |
| 11 | bye_tas_scscf | 16-tui system disconnect | | bye_ue_pcscf | 16-tui system disconnect |
| 12 | bye_pcscf_ue | 16-tui system disconnect | | bye_scscf_tas | 16-tui system disconnect |
| 13 | LABEL: | Request Terminated (scscf-tas) | | LABEL PREDICTED: | Database Lookup Failure (scscf-tas) |

FIG. 6B

Generate Reference Dataset

Receive Reference Trace Files
812

Extract Reference Communication Flows and Features
from Trace Files
814

Label Reference Communication Flows
818

Store Reference Communication Flows, Features and
Labels of Classification as Reference Dataset
822

End

ADAPTIVE NETWORK TRACE ANALYSIS USING REFERENCE COMMUNICATION FLOWS

BACKGROUND

This disclosure relates generally to analyzing network traces, and more specifically to predicting labels or classification of network traces of queries in an adaptive manner.

Network traces are records of data packets that travel across a network. Examples of the network traces include, for example, capture (CAP), packet capture (PCAP), PCAP Next Generation (NG), Opentelemetry and Jaeger trace files. These network traces are created by network sniffing tools or packet capture software, which capture and store individual network packets as they traverse a network interface or specific network segment. The network traces are widely used in various network-related activities such as network analysis, troubleshooting, and network security. The network traces may store the complete contents of each captured packet, including the packet header information, payload data, and any other relevant metadata. Taking the example of PCAP files, these files are formulated into a file format known as the libpcap format, which ensures compatibility and interoperability among different network analysis tools such as Wireshark, tcpdump, or Snort.

Traditionally, engineers manually analyze PCAP files using packet decoder applications like Wireshark to identify the root cause of communication failure or troubleshoot a network issue. They search for specific packets among thousands, sometimes hundreds of thousands, related to a subscriber and link them to other packets in the same communication flow. For example, when analyzing a network call, the engineer first locates the relevant packets and then links all messages related to the call across various protocols, such as DIAMETER, RTP, SIP, HTTP2, NGAP, NAS-5GS, and PFCP, to identify where the failure occurred. If multiple issues exist across different protocol interfaces, the engineer must determine the root cause and identify the network elements involved.

Manually performing these tasks can be time-consuming, taking anywhere from hours to days, and carries a significant risk of human error. While some automated solutions provide support to identify and troubleshoot network issues, they generally rely on information that is static and may not properly accommodate the evolving nature of the networks.

SUMMARY

Embodiments relate to analyzing network traces in an adaptive and dynamic manner. Reference communication flows, and corresponding features and labels are stored as a reference dataset. The labels indicate at least success or failure of communication or a type of failure. Network trace data in a query is processed to generate a query communication flow and corresponding features. The reference dataset is compared with the query communication flow and the features of the query communication flow to generate one or more candidate labels of the query communication flow. Output information is generated based on the candidate labels of the query communication flow. Feedback is received after presenting the output information. The stored reference dataset is updated according to the feedback.

In one or more embodiments, a subset of the reference dataset that is the most similar to the query communication flow and the features of the query communication flow is determined using a first algorithm. The candidate labels and information indicating the likelihood of the candidate labels being correct are generated by comparing the subset of the reference dataset with the query communication flow using a second algorithm. The second algorithm requires more computation than the first algorithm.

In one or more embodiments, the first algorithm performs vectorizing of the reference dataset into first vectors and vectorizing the query communication flow and the features of the query communication flow into a second vector. The first algorithm then compares the first vectors and the second vector to generate a similarity score for each of the reference communication flows.

In one or more embodiments, the subset of the reference dataset is selected according to similarity scores.

In one or more embodiments, the second algorithm aligns entries in the subset with entries in the query communication flow, and tallies the costs of modifying entries in each of the reference communication flows and associated labels in the subset to match entries in the query communication.

In one or more embodiments, the second algorithm assigns a first cost to modify an entry of the subset of the reference dataset to match an entry in the query communication flow and the features of the query communication flow. The second algorithm assigns a second cost higher than the first cost to modify a feature of a reference communication flow of the subset representing a type of failure of communication to match a corresponding feature of the query communication flow.

In one or more embodiments, the received reference trace data is processed to extract the reference communication flows. The features of the reference communication flows are extracted. Based at least on the extracted features of the reference communication flows, labels of the reference communication flows are added.

In one or more embodiments, the labels are added to the reference communication flows by feeding the reference communication flows and the features of the reference communication flows to one or more machine learning models.

In one or more embodiments, the stored reference dataset is updated by adding the query communication flow, the features of the query communication flow and one or more of the candidate labels determined to be accurate to the reference dataset.

In one or more embodiments, presenting the output information includes displaying one or more candidate labels where at least a subset of the one or more candidate labels indicates a cause of a failure in communication of the query communication flow.

In one or more embodiments, network packets in the network trace data are preprocessed to extract a subset of the network packets, and network packets in the subset of the network packets associated with the query communication flow are correlated. The features of the query communication flow are extracted from the correlated network packets.

In one or more embodiments, comparison operations are performed in a non-generic mode where a first cost is assigned for editing a dialog in a reference communication flow to match a dialog of the query communication flow, and a second cost is assigned for editing a feature of the reference communication flow to match a feature of the query communication flow. The second cost is higher than the first cost. In the non-generic mode, the similarity score of the reference communication flow is determined based on the first cost and the second cost. The comparison operation is switched to a generic mode where the first cost is assigned to editing the feature of the reference communication flow to match the feature of the query communication flow.

In one or more embodiments, the comparison operation is switched from the non-generic mode to the generic mode when a difference between the similarity score in the non-generic mode and the similarity score in the generic mode exceeds a threshold.

BRIEF DESCRIPTION OF THE DRAWINGS

FIG. 4 is a block diagram of a first and second trace processors, according to one embodiment.

FIG. 5A is a table illustrating an example reference communication flow and an example query communication flow, according to one embodiment.

FIG. 5B is a table illustrating the result of aligning the entries of the reference communication flow with the entries of the query communication flow of FIG. 5A, according to one embodiment.

FIG. 5C is a table illustrating a reference communication flow and its feature aligned with a query communication flow and its feature, according to one embodiment.

FIG. 6A is a table illustrating a reference communication flow and a query communication flow in a non-generic mode, according to one embodiment.

FIG. 6B is a table illustrating the reference communication flow and the query communication flow of FIG. 6A in a generic mode, according to one embodiment.

Figure 1:
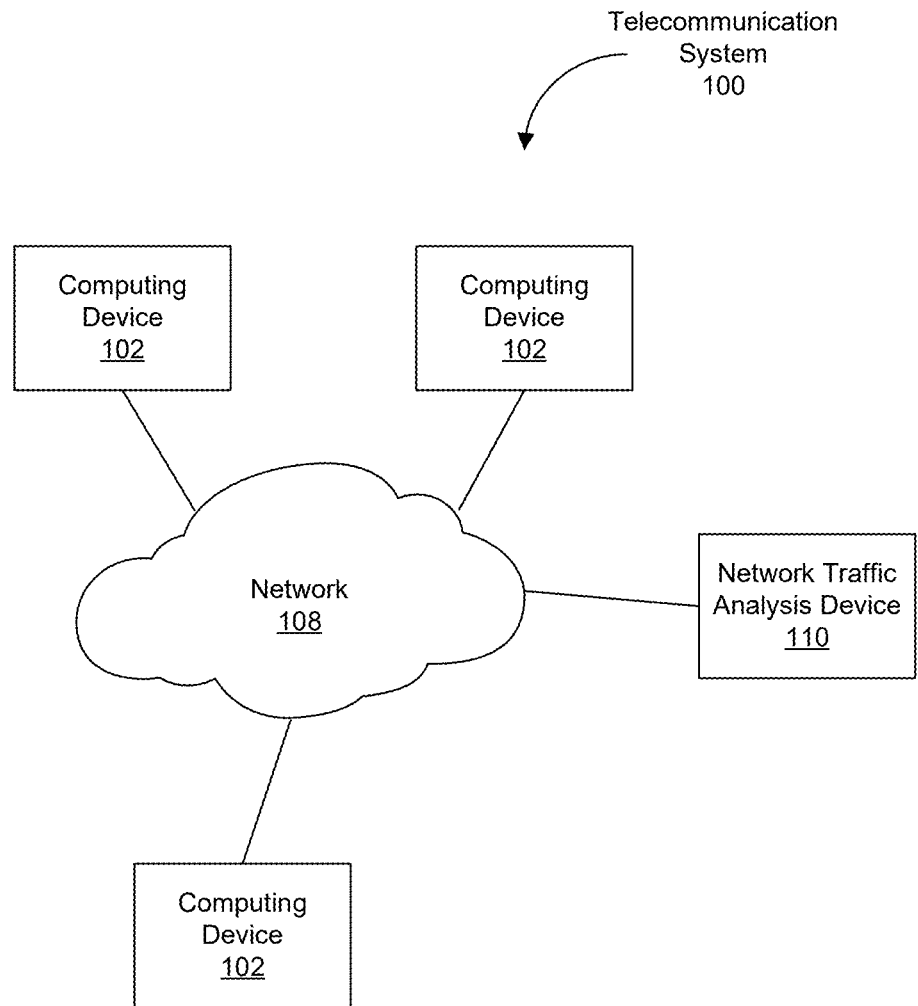
FIG. 1 is a diagram of a telecommunication system for providing information services, according to one embodiment.

The figures depict embodiments of the present disclosure for purposes of illustration only.

DETAILED DESCRIPTION

Embodiments are described herein with reference to the accompanying drawings. Principles disclosed herein may, however, be embodied in many different forms and should not be construed as being limited to the embodiments set forth herein. In the description, details of well-known features and techniques may be omitted to avoid unnecessarily obscuring the features of the embodiments. In the drawings, reference numerals in the drawings denote elements.

Embodiments relate to storing and updating reference communication flows as a reference dataset for comparison against a query communication flow to perform a network trace analysis. One or more network trace files are received as a query and processed into the query communication flow. Reference communication flows are processed to determine their features and labels. These reference communication flows and their features are stored and compared against the query communication flow and its features to identify a subset of labeled reference communication flows that are most similar. This subset is then compared with the query communication flow to generate candidate labels and related information. Feedback based on these predictions is received and used for updating the reference dataset adaptively. This approach reduces time-consuming manual operations in network trace analysis while continuously improving predictions based on the feedback.

A communication flow described herein refers to a sequence of exchange of network packets between two or more entities in a telecommunication network. The communication flow may be used to provide services using the telecommunication network. For example, in a Voice over IP (VoIP) call, the communication flow would include protocols like Session Initiation Protocol (SIP) for call setup, Real-time Transport Protocol (RTP) for audio streaming, and various signaling and control protocols for managing the call session.

A feature of a communication flow refers to information associated with specific events of the communication flow. The feature may indicate issues across protocols and network elements. Issues identified by the feature may include, among others, sequence, forward and backward messages, errors, failure indications, missing messages, and delays.

Overview of Example System

FIG. 1 is a diagram of a telecommunication system 100 for providing information services, according to one embodiment. System 100 includes computing devices 102 and a network traffic analysis device 110. The computing devices 102 and the network traffic analysis device 110 are connected to each other via network 108. In other embodiments, different and/or additional components may be included in the system 100.

Computing devices 102 are hardware, software or a combination thereof for performing computing operations that involve communication over network 108. For this purpose, a computing device may include, among other components, a processor, memory, and a network interface. The computing device may be embodied as a server, a desktop computer, a laptop computer, a cellular phone, a smartphone, a game console, a set-top box, a personal digital assistant (PDA), or IoT devices, among other things. Computing devices 102 communicate over network data or information formulated into packets.

Network traffic analysis device 110 is hardware, software or a combination thereof for monitoring and analyzing network traffic in a network. For this purpose, network traffic analysis device 110 captures network packets in network 108 and analyzes various aspects of the traffic such as source and destination of the network packets, protocols used, packet sizes, Packets Messages type, attributes and handshaking pattern, end-to-end services call flow, and timing information. The details of the network traffic analysis device 110 are described below in detail with reference to FIGS. 2 through 4.

Network 108 is a collection of network devices that communicate and route network packets from a source computing device to one or more destination computing devices, and may embodied as, among others, Local Area Networks (LANs), Wide Area Networks (WANs), Wireless Local Area Networks (WLANs), Metropolitan Area Networks (MANs), Campus Area Networks (CANs), Storage Area Networks (SANs), Virtual Private Networks (VPNs), Intranets, Extranets, the Internet, Peer-to-Peer Networks, Mobile Networks and a combination thereof. These networks may be implemented using one or more communication technologies such as Ethernet, Universal Serial Bus (USB), Wi-Fi, Bluetooth, Zigbee, Z-Wave, Global System for Mobile Communications (GSM), Code Division Multiple Access (CDMA), Long-Term Evolution (LTE), Second Generation (2G), Third Generation (3G), Fourth Generation (4G), Fifth Generation (5G), and Sixth Generation (6G).

Architecture of Traffic Analysis Device

Figure 2:
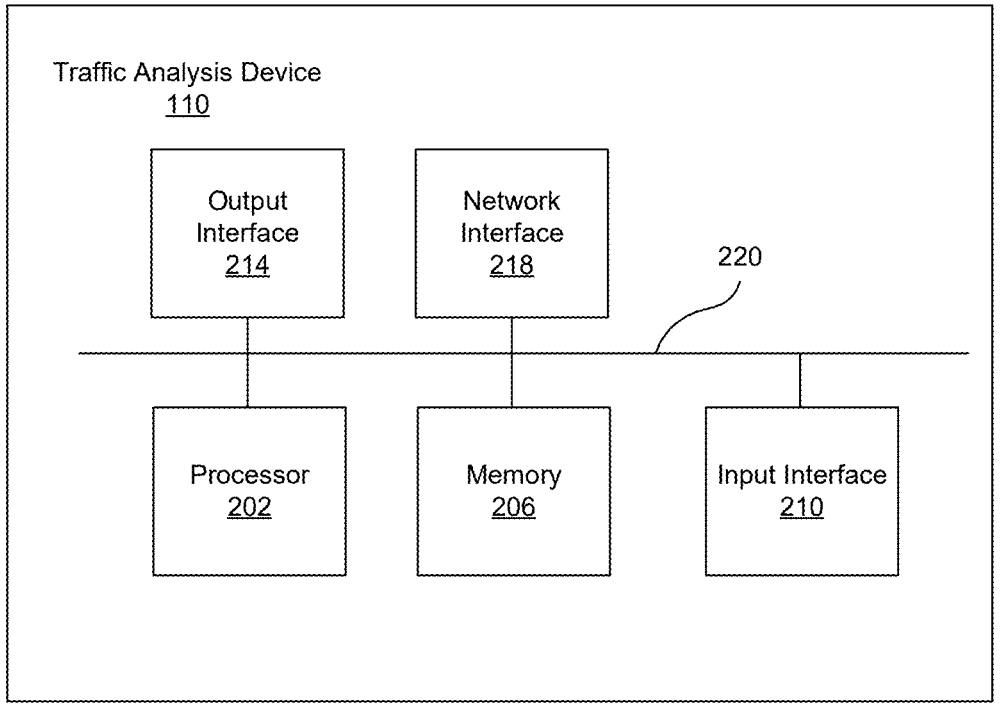
FIG. 2 is a block diagram of a traffic analysis device, according to one embodiment.

FIG. 2 is a block diagram of network traffic analysis device 110, according to an embodiment. The network traffic analysis device 110 may include, among other components, a processor 202, a memory 206, an input interface 210, an output interface 214, a network interface 218, and a bus 220 connecting these components. Network traffic analysis device 110 may include further components such as power supply, not illustrated in FIG. 2.

Processor 202 retrieves and executes commands stored in memory 206. Processor 202 may be embodied as a central processing unit (CPU), a graphics processing unit (GPU) or application-specific integrated circuits (ASICs). Although only a single processor 202 is illustrated in FIG. 2, multiple processors may be provided in network traffic analysis device 110. Although only a single processor is illustrated in FIG. 2, traffic analysis device 110 may include more than one processor operating in parallel or each processor performing dedicated functions.

Memory 206 stores software components for generating a reference dataset and processing a query. Memory 206 may be embodied using various technologies or their combinations, including, for example, Random Access Memory (RAM), Read-Only Memory (ROM), flash memory, Hard Disk Drive (HDD), Solid-State Drive (SSD), virtual memory, magnetic tape and optical discs. Various software components stored in memory 206 are described below in detail with reference to FIGS. 3 and 4.

Input interface 210 is hardware or hardware in combination with software that receives data from external sources. The external source may include user interface devices such as a pointing device and keyboard.

Output interface 214 is hardware or hardware in combination with software that provides the result of computation in various forms (e.g., image or audio signals). Output interface 214 may include, for example, a display device. The result of predicting or estimating candidate labels of a query communication flow may be formulated into tables, graphs or texts, and presented to a human operator for further actions. Output interface 214 may also provide graphical user interface (GUI) for receiving user inputs on operations associated with the operation of network traffic analysis device 110.

Network interface 218 enables network traffic analysis device 110 to receive network packets for analysis and/or communicate with computing devices via network 108. Network interface 218 may be embodied as network interface card (NIC) or a network adaptor, and implements various network protocols and standards.

Figure 3:
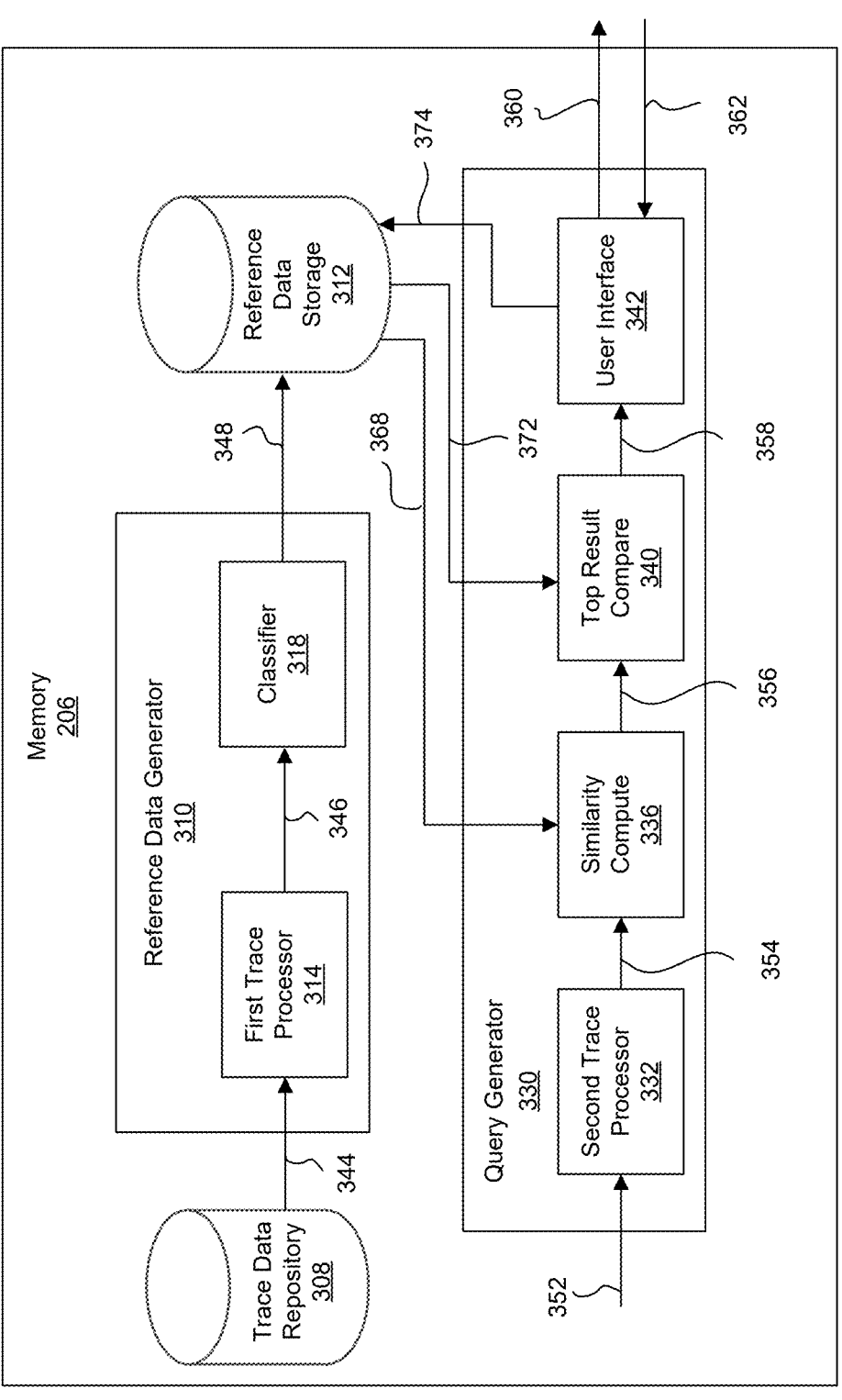
FIG. 3 is a block diagram of software components in memory of the traffic analysis device, according to one embodiment.

FIG. 3 is a block diagram of software components in memory 206 of network traffic analysis device 110, according to one embodiment. Memory 206 may store, among other software components, trace data repository 308, reference data generator 310, reference data storage 312 and query generator 330. The components illustrated in FIG. 3 are merely illustrative and memory 206 may include more or fewer components. For example, reference data generator 310 and query generator 330 may share one or more common components such as first trace processor 314 and second trace processor 332, as explained below with reference to FIG. 4.

Trace data repository 308 is a repository for storing network trace data to be processed into an initial reference dataset. The network trace data may be (i) collected by network traffic analysis device 110 or other components of system 100, (ii) at least partially be created synthesized artificially (e.g., through a generative artificial intelligence (AI)), and/or (iii) be provided by a user or other sources. The network trace data may be in the form of, including, but not limited to capture (CAP) files, packet capture (PCAP) files, PCAP Next Generation (NG) files, Opentelemetry and Jaeger trace files. As described below in detail with reference to query generator 330, the initial reference dataset may be updated based on feedback to include additional communication flows, their features and labels.

Reference data generator 310 is software, hardware, firmware or a combination thereof for processing trace files 344 received from trace data repository 308 to generate labeled communication flows 348. For this purpose, reference data generator 310 may include first trace processor 314 that correlates packets in trace files 344 to generate reference communication flows 346. Reference data generator 310 also generates the features of the reference communication flows 346 and sends them to classifier 318. The details of first trace processor 314 are described below in detail with reference to FIG. 4.

Classifier 318 of reference data generator 310 then receives reference communication flows 346 and their features, classifies the reference communication flows 346 using the received information, and adds labels to the reference communication flows 346, according to the classification. The labels may be indicative of failure or success of the communication associated each of the reference communication flows 346. In one or more embodiments, the labels may also indicate the types of failure and/or root causes of the failures. The added labels may be associated with a specific message in the reference communication flow and may include identifiers of the root causes of the failures. An identifier for a root cause of a failure may be, for example, a frame number, a dialog name or a feature in a reference communication flow. In one or more embodiments, classifier 318 may include one or more machine learning models to perform the labeling operation automatically as described, for example, in U.S. patent application Ser. No. 18/353,920, entitled "Network Packet Capture Analysis Using Machine Learning Model," filed on Jul. 18, 2023, which is incorporated by reference in its entirety. In addition or in lieu of such labeling based on the machine learning models, classifier 318 may receive inputs from users indicating the correct labels of reference communication flow 346 based on manual investigation and analysis. The reference communication flows along with their features and labels are collectively referred to as labeled communication flows 348 hereinafter. Generated labeled communication flows 348 are then sent to reference data storage 312 for storage.

Reference data storage 312 stores generated labeled communication flows 348 as a reference dataset. In one or more embodiments, reference data storage 312 is embodied as a database. As described below in detail with reference to query generator 330, the data stored in reference data storage 312 is not static and may be updated according to feedback data 374. Such dynamic or adaptive updating of the reference dataset enables query generator 330 to render accurate prediction or estimates as to answers to the queries by increase the number and diversity of the reference dataset.

Query generator 330 is software, hardware, firmware or a combination thereof for receiving a query including trace data 352 and generates output information 360 according to predicted or expected labels (hereinafter referred to as "candidate labels") of a communication flow associated with trace data 352 in the query. For this purpose, query generator 330 may include, among other components, second trace processor 332, similarity compute module 336, top result compare module 340, and user interface module 342. Query generator 330 may include more modules than what are illustrated in FIG. 3 or combine one or more of these modules into a single module. Further, some of these components of query generator 330 may be shared with reference data generator 310.

Second trace processor 332 receives trace data 352 of the query, generates a query communication flow 354 by correlating packets in trace data 352, and extracts features of the query communication flow 354. Query communication flow 354 includes a sequence of exchange of network packets between two or more entities in a telecommunication network. The details of second trace processor 332 is described below in detail with reference to FIG. 4.

While query generator 330 may compare all of stored reference dataset 368 against query communication flow 354 and its features using the same algorithm to determine candidate labels of query communication flow 354 and related information, query generator 330 may also perform a preliminary filtering to select a subset of the reference dataset and then compare only the selected subset of the reference dataset with query communication flow 354 and its features to determine candidate labels and related information. Specifically, query generator 330 may use a first algorithm to select a subset 372 of the stored reference dataset, and then apply a second algorithm on the subset 372 of the stored reference dataset to generate the candidate labels. In this way, the computational resources for determining the candidate labels of query communication flow 354 may be reduced while not impacting the accuracy of the prediction or estimation of the candidate labels.

Similarity compute module 336 may perform the first algorithm to select the subset of stored reference dataset 368. The first algorithm may be a vectorization algorithm. The vectorization algorithm converts the query communication flow and its features into a first n-gram while also converting each of the reference communication flows and corresponding features of stored reference dataset 368 into second n-grams. The vectorization algorithm then determines the similarity of the first n-gram and each of the second n-grams by using standard metrics such as Jaccard index, Euclidean distance and cosine similarity. In this example, an n-gram of a communication flow is a continuous sequence of "n" number of packets or dialogues and their features associated with the communication flow. The vectorization algorithm involves low computation resources but may be inaccurate in identifying the reference dataset that are the most similar to the query communication flow. By using the vectorizing algorithm, similarity compute module 336 generates similarity scores, each indicating the similarity of a reference communication flow and its features relative to the query communication flow and its features.

Algorithms that may be used as the first algorithm for determining similarity of the reference communication flows and the query communication flow are not limited to vectorization algorithms. Various other algorithms may be used as the first algorithm in similarity compute module 336 to determine the first similarity scores. Such algorithms may use data representation such as One-hot Encoding, Bag-of-Words (BoW), Term Frequency-Inverse Document Frequency (TF-IDF), Word Embeddings (e.g., Word2Vec, GloVe), Sentence Embeddings, Positional Encoding, Transformer-based Embeddings, Autoencoders, Recurrent Neural Networks (RNN) Encoder, and Long Short-Term Memory (LSTM) Encoder. The similarity/distance metrics generated by these algorithms may include, but are not limited to, Euclidean Distance, Manhattan Distance, Cosine Similarity, Jaccard Similarity, Hamming Distance, Pearson Correlation, Spearman's Rank Correlation, Mahalanobis Distance, Levenshtein Distance, Dice's Coefficient and Kendall Tau Distance.

After the similarity scores are obtained by the first algorithm, the similarity scores and the identification of corresponding reference communication flows (shown as data 356) are then sent to top result compare module 340. In some embodiments, multiple algorithms may be used in conjunction to determine the similarity scores for filtering the reference dataset into subset 372 of reference dataset.

Top result compare module 340 is a software module that determines candidate labels 358 of the query communication flow by comparing the query communication flow with subset 372 of reference dataset, selected using the similarity scores and the identification of corresponding reference communication flows. That is, subset 372 of reference dataset are some of the labeled reference communication flows determined to be most similar to the query communication flow. The number of reference communication flows in the subset 372 of reference dataset may be fixed or may change dynamically based on various factors. The operations at top result compare module 340 are described below in detail with reference to FIGS. 5A through 6B.

After top result compare module 340 determines the similarity of subset 372 of reference dataset and the query communication flow and its features, top result compare module 340 combines or processes the labels of the reference communication flows in the subset 372 of reference dataset to generate the candidate labels 358 and related information. For example, the candidate labels of the communication flows may be predicted or estimated to be the same as the labels of the reference communication flows with the highest similarly scores. In some embodiments or modes (e.g., non-generic mode) of query generator 230, a reference communication flow that are similar to the query communication flow (as indicated by the similarity scores) may be disregarded in generating the candidate labels if the features in the reference communication flow do not match those of the query communication flow. In other words, even if the reference communication flow and the query communication flow are similar, the candidate labels of the query communication flow may be different from those of the reference communication flows with the highest similarity scores if the features of the reference communication flows do not contain, for example, appropriate root causes. In other embodiments or modes (e.g., generic mode), the reference communication flows with the highest similarity scores are used for generating the candidate labels even if the features do not match.

The related information may indicate, for example, the likelihood that a candidate label is correct. The likelihood that the candidate label is correct may be represented by a similarity score in the form of a normalized edit cost, as described below in detail with reference to FIG. 5B, or by further processing the normalized edit cost. The lower the normalized edit cost associated with a reference communication flow, the more likely that a label of the reference communication flow is an accurate candidate label for the query communication flow. In one or more embodiments, top result compare module 340 may give more weight to the reference communication flows having their entries and features more similar to those of the query communication flow. In other embodiments, top result compare module 340 passes on the labels of the reference communication flows in subset 372 of the reference dataset to user interface module 342.

User interface module 342 is a software module that presents output information 360 on the candidate labels of the query communication flows and related information to a user. The candidate labels and the related information may be formulated into a graphical user interface (GUI) as output information for display to the user. User interface module 342 may also receive feedback 362 from the user on the accuracy/inaccuracy of the candidate labels after the user is presented with the candidate labels and the related information. Feedback 362 may indicate which of the candidate labels are accurate, and if none of the candidate labels are accurate, the accurate labels of the query communication flow may be included in feedback 362.

In one or more embodiments, feedback 362 received from the user is validated. The validation may be performed, for example, by an operator of network traffic analysis device 110, a subject matter expert (SME) or an automated algorithm. After feedback 362 is validated, user interface module 342 sends feedback data 374 to reference data storage 312 so that the validated result may be used to update the reference dataset. For example, the validated query communication flow and its candidate labels determined to be accurate by the user and/or by the validation process, the validated query communication flow and the accurate labels may be added to the reference dataset of reference data storage 312. Further, feedback data 374 may indicate removal of some reference communication flows and their labels in reference data storage 312.

In one or more embodiments, network traffic analysis device 110 is located at a site that is secure. Reference data generator 310, reference data storage 312 and query generator 330 are beneficially included in the same traffic analysis device 110 or at least in a different traffic analysis devices on the same site. Accordingly, the updating of the reference dataset may be performed on-premise without or with minimal transferring of data externally. In this way, the data privacy protection and the security of data associated with the network analysis and troubleshooting may be enhanced.

Example Components of Trace Processor

FIG. 4 is a block diagram of first trace processor 314 and second trace processor 332, according to one embodiment. These trace processors may include, among other components, packet extractor 424, intra protocol correlator 428, inter protocol correlator 432, and feature extractor 436. First trace processor 314 and second trace processor 332 may include components other than what are illustrated in FIG. 4. Further, although first trace processor 314 and second trace processor 332 are illustrated in FIG. 3 as being separate components, the same trace processor may be used in reference data generator 310 and query generator 330.

Packet extractor 424 is a software component that identifies and extracts relevant network packets for further processing. Packet extractor 424 may focus on certain protocols used in a service of interests such as Session Initiation Protocol (SIP), Packet Forwarding Control Protocol (PFCP), GPRS Tunneling Protocol version 2 (GTPV2) and S1 Application Protocol (S1AP). By filtering out unnecessary network packets, packet extractor 424 ensures that only packets related to the protocols of interest are retained while other packets are discarded.

Intra protocol correlator 428 is a software component that correlates network packets associated with each procedure within a protocol. For example, intra protocol correlator 428 identifies and links request messages with corresponding responses and other messages related to the same transaction. In one or more embodiments, the correlation within the protocol may be performed within the context of a particular protocol and subscribers. In one or more embodiments, the correlated network packets may be identified with an identifier shared across the correlated network packets.

Inter protocol correlator 432 is a software component that correlates network packets associated with the same service for the same subscriber. A service may be associated with multiple transactions and/or communication flows. In one or more embodiments, inter protocol correlator 432 constructs a communication flow that may include network packets associated with different protocols in a coherent way. In doing so, inter protocol correlator 432 may use the identifiers assigned by intra protocol correlator 428. The network packets in the same communication flow may be assigned with a same identifier that are shared by these network packets.

Feature extractor 436 is a software component that extracts, from correlated network packets, features that are a higher granularity level of information than the list of packets. The high level information may be network performance indicators such as sequence, forward and backward messages, errors, failure indications, missing messages, and delays. The reference communication flows and their extracted features are sent to classifier 318 for further processing while the query communication flow and its extracted features are sent to similarity compute module 336 for further processing.

Example Comparison Operations of
Communication Flows

FIG. 5A is a table illustrating an example reference communication flow and an example query communication flow, according to one embodiment. Each entry in the table corresponds to a dialogue in a reference communication flow or a query communication flow. FIG. 5A shows a simplified version of the operations performed at top result compare module 340 where only dialogs of the communication flows are considered in generating similarity scores. The entries in the reference communication flow and the query communication flow in FIG. 5A are shown as not being aligned. That is, entries in lines 1 through 4 of both communication flows are identical whereas some entries in the reference communication flow are missing from the query communication flow and other entries are misaligned.

FIG. 5B is a table illustrating result of performing alignment to the reference communication flow and the query communication flow of FIG. 5A, according to one embodiment. The example of FIG. 5B determines Levenshtein distances or their variants as the similarity scores for entries in the reference communication flows and entries in the query communication flow. Costs of edit operations to match the two communication flows are determined by top result compare module 340.

In FIG. 5B, entries in both communication flows are aligned, and the column "Edit Operation" indicates the edits to be made in the reference communication flow to match the query communication. Entries of lines 1-4 and 9-10 in both communication flows match, and hence, no edit is performed. However, entries in lines 5-8 of the reference communication flow are to be deleted since no corresponding entries are present in the query communication flow. Finally, entries in lines 11-12 of the reference communication flow are to be substituted to match the corresponding entries in the query communication flow. In this example, each edit operation has a cost of 1, and hence, the total editing cost would be 6 (4 delete operations and 2 substitute operations).

Since the editing cost would be higher if the communication flows are longer, such raw cost may be normalized. For this purpose, the maximum edit cost representing the highest number of possible edits given the entries of the reference communication flow and the query communication flow is used as a basis for the normalization. For example, in the example of FIG. 5B, the maximum edit cost would be 12 if there is no matching entries between the two communication flows. Hence, normalization of the edit cost 6 by the maximum edit cost of 12 would result in a similarity score of $1-\frac{6}{12}=0.5$. The similarity score in the form of normalized edit score is obtained for each of the reference communication flow relative to the query communication flow.

In the example of FIGS. 5A and 5B, only the dialogs of the reference communication flows and the query communication flows were considered to determine the similarity scores. For more accurate determination, features of the reference communication flows and the features of the query communication flow may be considered in addition to the dialogs to determine the similarity scores. The features of the communication flows may be information associated with specific events of the communication flow and may include, but not limited to, sequence, forward and backward messages, errors, failure indications, missing messages, and delays. FIG. 5C is a table illustrating a reference communication flow and a feature (i.e., failure indication) aligned to a query communication flow and a corresponding feature (i.e., failure indication), according to one embodiment. In the example of FIG. 5C, the feature of "failure indication" in both the reference communication flow and the query communication flow are considered in addition to the dialogs in the two communication flows. The "failure indication" is merely an example of features that may be considered, and other features of the communication flows may be considered in addition or in lieu of the "failure indication" feature in determining the similarity scores.

In FIG. 5C, lines 5-6 in the "failure indication" column of the reference communication flow indicate the failure of "108-New Dialog Established" whereas no such failure indication is present for the query communication flow. Further, lines 11-12 in the "failure indication" column of the reference communication flow indicate the failure of "16-tui system disconnect" while the same lines of "failure indication" column in the query communication flow indicate the failure of "User Triggered." Hence, in order to match the dialogs and the failure indications of the reference communication flow with those of the query communication flow, the failure indications in lines 5-6 of the reference communication flow should be deleted and the failure indications in lines 11-12 of the reference communication flow should be substituted, in addition to the edit operations described above with reference to FIG. 5B.

In one or more embodiments, the edit operations to edit the features of the reference communication flow are assigned a higher edit cost or weight compared to that of editing the dialogs. For example, editing an entry of the failure indication may incur the edit cost of 8 while editing an entry of the dialog may incur the edit cost of 1. If such different edit costs are used, the total edit cost would be 38=6 (editing of dialogs)+{8 (edit cost for failure indication)×4 (2 deletes and 2 substitutions of the failure indications). The maximum edit score in the case of all the dialogs and the failure indications in the reference communication flow being made would be 44 (=12+8×4) in the instance of FIG. 5C. Accordingly, the normalized edit cost, which is the similarity score, would be 0.14 ($=1-\frac{38}{44}$). In practice, top result compare module 340 may consider many more features in determining the similarity scores of the reference communication flows. In such case, the same edit costs may be applied to edits to all the features or different edit costs may be assigned to different features.

Example Use of Generic Mode

FIG. 6A is a table illustrating an example of a reference communication flow and a query communication flow in a non-generic mode, according to one embodiment. In the non-generic mode, a higher edit cost (e.g., 8) is assigned to edits to the features compared to edits cost (e.g., 1) for the dialogs, as explained above with reference to FIG. 5C. If there are many edits to be made to the features in the reference communication flow to match those of the query communication flow, the resulting similarity score may be very low. When the highest similarity score among the similarly scores of the subset of reference dataset is below a threshold, top result compare module 340 may conclude that there is no reference communication flow that is sufficiently similar to the query communication flow. Hence, line 13 of FIG. 6A indicates that no candidate label (shown as "Label Predicted") corresponding to the root cause of the error was found.

When there is no reference communication flow with a similarity score above the threshold, top result compare module 340 may switch to a generic mode where editing a feature (e.g., failure indication) associated with the reference communication flow would have the same edit cost as editing a dialog. Alternatively, top result compare module 340 may switch to the generic mode when a difference of the similarity score in the generic mode and the similarity score in the non-generic mode exceeds a threshold. That is, in the generic mode, no additional penalty edit cost is assigned to editing the features. By operating in the generic mode, the similarly score of the reference communication flow would be increased. As shown in FIG. 6B, the reference communication flow and the failure indication match perfectly when the two failure indications in lines 1-2 are substituted. In the generic mode, the label of the reference communication flow indicating the root cause of the error "Request Terminated" shown in line 13 is modified into a candidate label indicating that the root cause of the error is ("Database Lookup Failure").

The threshold for using the generic mode may be set to increase the performance of the prediction or estimation of the candidate labels. In one embodiment, the accuracy of prediction or estimation of the candidate labels is assessed with different threshold values. Then the threshold values that statistically resulted in an accuracy above a target level in the candidate labels are selected and used for switching to the generic mode. In one or more embodiments, a leaveone-out validation approach is used to determine the performance of different threshold values. The threshold values meeting the target level of accuracy are then examined for F1 score. One of the threshold values that satisfies both the performance requirement (e.g., accuracy) and higher F1 score is then selected as the threshold for switching to the generic mode.

By using the generic mode, issues and causes that are not included in the labels of the reference set may be predicted or estimated as modified versions of the labels corresponding to the reference communication flows.

Example Processes of Performing Adaptive Trace Analysis

Figure 7:
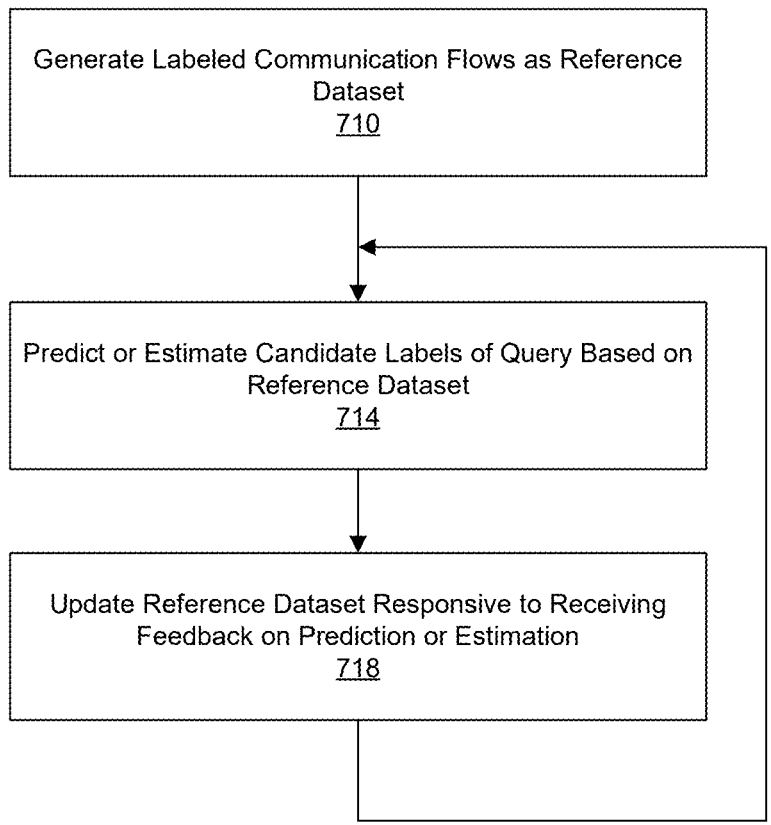
FIG. 7 is a flowchart illustrating an overall process for using a reference dataset to perform network trace analysis, according to one embodiment.

FIG. 7 is a flowchart illustrating an overall process for using and updating reference data to perform network trace analysis, according to one embodiment. First, labeled communication flows are generated 710 from trace files and stored as a reference dataset. The labeled communication flows include the reference communication flows, their features extracted from the trace files, and labels indicating success/failure of communication corresponding to the reference communication flows and/or the types of failure. The trace reference dataset is then stored in reference data storage 312 for use in predicting or estimating the candidate labels of the query communication flow. The process of generating 710 the reference dataset is described below in detail with reference to FIG. 8.

Then, the candidate labels of the query is predicted or estimated 714 based on the reference dataset. The query includes trace files to be queried for the analysis. The trace files in the query are processed into the query communication flow and its features. The candidate labels of the query communication flow may be the same as the labels of a select number of the reference communication flows that are most similar to the communication flow in terms of their dialogs and the features. Alternatively, the candidate labels may be modified versions of the labels of the reference communication flows that are most similar to the communication flow in terms of their dialogs and the features. The process of predicting or estimating the candidate labels is described below in detail with reference to FIG. 9.

The stored reference set is then updated 718 according to feedback on the candidate labels and related information. The related information may indicate, among others, the likelihood of the candidate labels being accurate. Such likelihood may be in the form of similarity scores indicating how similar the reference communication flows and their features are compared to the query communication flow and its features. The feedback may be received after presenting the candidate labels and the related information to the user or an SME, or after processing them through an automatic algorithm. After the user reviews the information generated from the candidate labels and the related information, the user may provide feedback indicating, for example, which of the candidate labels are correct or incorrect. The reference dataset may be updated, for example, to include the query communication flow, its features and its correct candidate labels.

After updating 718 the reference dataset, the process returns to receiving the next query to predict or estimate 714 the candidate labels of the next query. In one or more embodiments, the predicting or estimating 714 the candidate labels may be performed on a communication flow basis. That is, even if the query includes multiple query communication flows, each query communication flow is processed individually one by one. The process may terminate after all of the query communication flows are processed.

Figure 8:
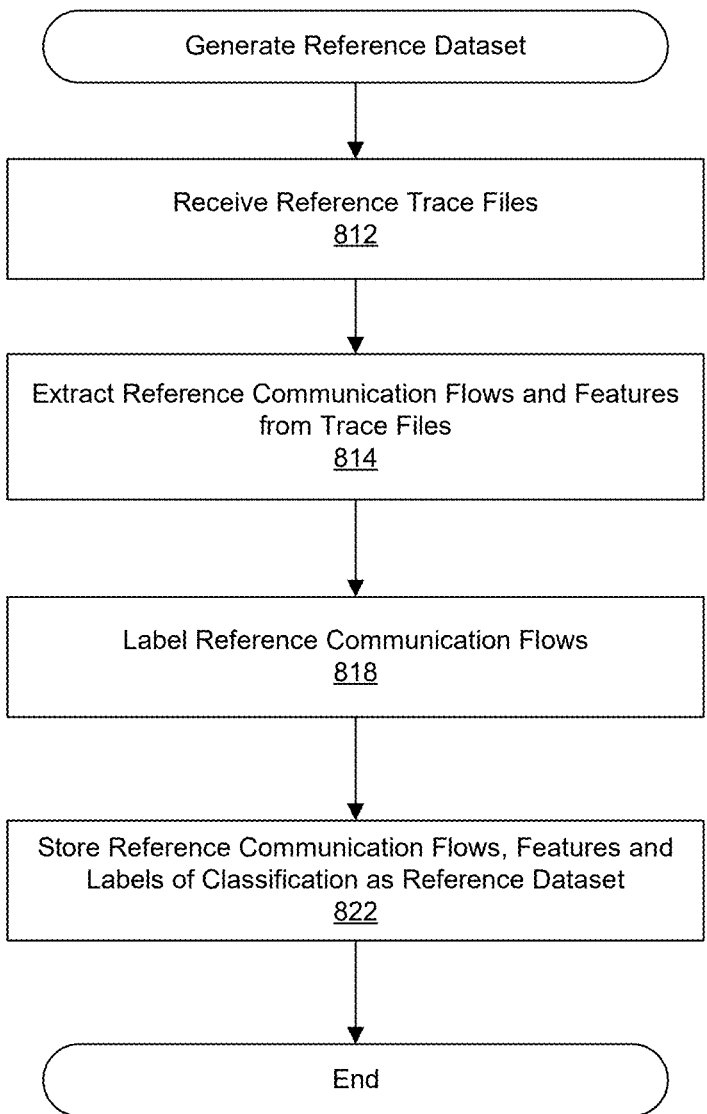
FIG. 8 is a flowchart illustrating a process of generating the reference dataset, according to one embodiment.

FIG. 8 is a flowchart illustrating the process of generating the reference dataset, according to one embodiment. Trace files are received 810 from one or more sources for generating the reference dataset. The received trace files are then processed to extract 814 reference communication flows by correlating the network packets, and features are extracted from the correlated network packets. Specifically, only the network packets relevant to certain protocols of interest are extracted from the trace file. Then, these extracted network packets associated with each procedure within a protocol are correlated followed by correlating of the network packets associated with the same service for the same subscriber. In this way, the reference communication flows are extracted. The features are also extracted from the correlated packets associated with each reference communication flow.

The reference communication flows are labeled 818 by processing the entries (e.g., dialogs) of the reference communication flows and their extracted features. The classification of the reference communication flows for labeling may be performed automatically using, for example, one or more machine learning models, by manual review and verification, or a combination of both.

The reference communication flows, their features and their labels are stored 822 in a reference data storage. Once the candidate labels of the query communication flow are verified, the verified candidate labels, their features and the query communication flow may be added to the reference dataset for storing.

Various modifications may be made to the processes and the sequence illustrated in FIG. 8. For example, the process of receiving 812 may be omitted and the reference communication flows and their features may be received from a source. Further, the processes of extracting 814 the reference communication flows and their features may be performed in parallel with labeling 818 of the reference communication flows.

Figure 9:
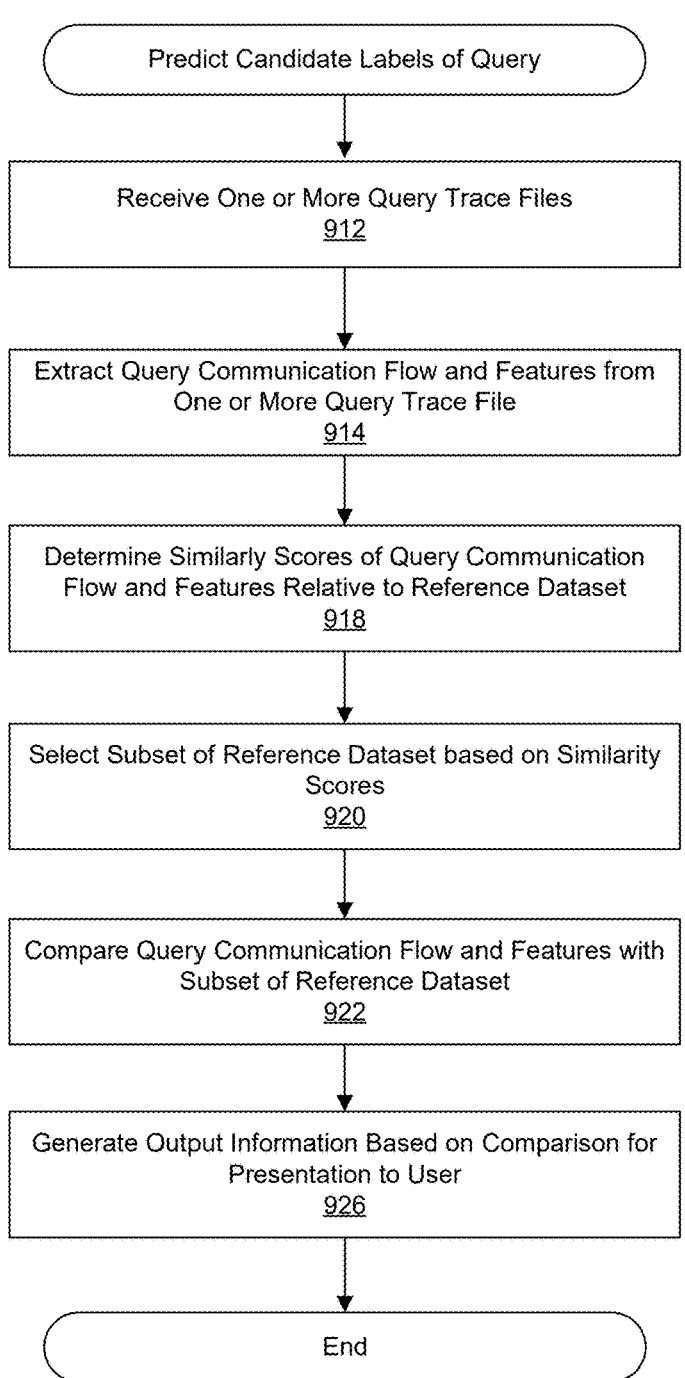
FIG. 9 is a flowchart illustrating a process of predicting or estimating candidate labels of a query, according to one embodiment.

FIG. 9 is a flowchart illustrating a process of predicting the candidate labels of a query, according to one embodiment. One or more query trace files associated with a query communication flow are received 912. From the query trace files, the query communication flow and its features are extracted 914 in the same manner as the reference communication flows. In one or more embodiments, the same module may be used for extracting communication flows and its features for both a reference communication flow and a query communication flow.

Similarity scores of the query communication flow and its features relative to each of the reference communication flows and its features in the reference dataset are determined 918. One or more algorithms may be used for all of the reference communication flows and their features to obtain a similarity score for each of the reference communication flows. The similarity score obtained in this manner may be used to select 920 a subset of the reference communication flows in the reference dataset for further comparison with the query communication flow. In one or more embodiments, a number of reference communication flows with the highest similarity scores are selected for further comparison.

Each of the reference communication flows and their features in the subset of the reference dataset is then compared 922 with the query communication flow and its features. In one or more embodiments, Levenshtein distances of the reference communication flows and their features relative to the query communication flow and its features are determined for use as similarity scores. Based on the similarity scores, the candidate labels of the communication flow are determined.

The candidate labels of the query communication flow and the related information (e.g., similarity scores) are then processed to generate 926 output information for presentation to the user. In one or more embodiments, the output information is displayed to the user using GUI that enables the user to intuitively and easily understand the prediction or estimation of the labels associated with the query communication flow.

Various modifications may be made to the processes and the sequence illustrated in FIG. 9. For example, the process of selecting 920 a subset of reference dataset may be omitted. Further, generating 926 the output information may be performed in a pipelined manner so that the output information is incrementally updated as comparing 922 of reference communication flows with the query communication flow is concluded.

Alternative or Additional Embodiments

Although only a single network traffic analysis device is described in the above embodiments, multiple network traffic analysis devices may be deployed and perform the network analysis operations. The results or prediction from each of the network traffic analysis devices may be shared among the network traffic analysis device to make better diagnosis of the network issues and take more appropriate remedial actions. In such embodiments, each of the network traffic analysis device may perform analysis on a subset of users, services or network components.

Upon reading this disclosure, those of skilled in the art will appreciate still additional alternative designs for processing nodes. Thus, while particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A method for analyzing network traces, comprising:
storing, as a reference dataset, reference communication flows, and corresponding features and labels, the labels indicating at least success or failure of communication or a type of the failure;
processing network trace data in a query to generate a query communication flow by at least:
preprocessing network packets in the network trace data to extract a subset of the network packets, and correlate network packets in the subset of the network packets associated with the query communication flow, and
extracting the features from the correlated network packets;
comparing the reference dataset with the query communication flow and features of the query communication flow to generate one or more candidate labels of the query communication flow by at least:
determining a subset of the reference dataset having greatest similarity to the query communication flow and the features of the query communication flow using a first algorithm; and determining the candidate labels and information indicating likelihood of the candidate labels being correct by comparing the subset of the reference dataset with the query communication flow using a second algorithm requiring more computation than the first algorithm;
presenting output information based on the candidate labels of the query communication flow;
receiving feedback responsive to presenting the output information; and
updating the stored reference dataset according to the feedback.

2. The method of claim 1, wherein the first algorithm comprises:
vectorizing the reference dataset into first vectors;
vectorizing the query communication flow and the features of the query communication flow into a second vector; and
comparing the first vectors and the second vector to generate first similarity scores.

3. The method of claim 2, wherein the first algorithm further comprises:
selecting the subset of the reference dataset according to the first similarity scores.

4. The method of claim 1, wherein the second algorithm aligns entries in the subset with entries in the query communication, and tallies costs of modifying entries in each of reference communication flows and associated labels in the subset to match entries in the query communication flow.

5. The method of claim 4, wherein the second algorithm assigns a first cost to modify an entry of the subset to match an entry in the query communication flow and the features of the query communication flow, and the second algorithm assigns a second cost higher than the first cost to modify a feature of a reference communication flow of the subset representing a type of failure of communication to match a corresponding feature of the query communication flow.

6. The method of claim 1, further comprising:
receiving reference trace data from a repository;
processing the received reference trace data to extract the reference communication flows;
extracting the features of the reference communication flows; and
adding labels to the reference communication flows based at least on the extracted features of the reference communication flows.

7. The method of claim 6, wherein adding the labels to the reference communication flows comprises feeding the reference communication flows and the features of the reference communication flows to one or more machine learning models to produce to the labels.

8. The method of claim 1, wherein updating the stored reference dataset comprises adding, to the reference dataset, the query communication flow, the features of the query communication flow and one or more of the candidate labels determined to be accurate.

9. The method of claim 1, wherein presenting the output information comprises displaying the one or more candidate labels, at least a subset of the one or more candidate labels indicating a cause of a failure in communication of the query communication flow.

10. The method of claim 1, wherein comparing the reference dataset with the query communication flow and features of the query communication flow comprises:
operating in a non-generic mode assigning (i) a first cost for editing a dialog in a reference communication flow to match a dialog of the query communication flow, and (ii) a second cost to editing a feature of the reference communication flow to match a feature of the query communication flow, the second cost being higher than the first cost, and determining a similarity score of the reference communication flow based on the first cost and the second cost; and switching to a generic mode where the first cost is assigned to editing the feature of the reference communication flow to match the feature of the query communication flow, and the similarity score of the reference communication flow is based on the first cost but not on the second cost.

11. The method of claim 10, wherein the non-generic mode is switched to the generic mode responsive to a difference between the similarity score in the non-generic mode and the similarity score in the generic mode exceeds a threshold.

12. A network traffic analysis device, comprising:

one or more processors; and memory storing instructions thereon, the instructions when executed by the one or more processors cause the one or more processors to:

store, as a reference dataset, reference communication flows, and corresponding features and labels, the labels indicating at least success or failure of communication or a type of the failure;

process network trace data in a query to generate a query communication flow by at least:

preprocessing network packets in the network trace data to extract a subset of the network packets, and correlate network packets in the subset of the network packets associated with the query communication flow, and extracting the features from the correlated network packets;

compare the reference dataset with the query communication flow and features of the query communication flow to generate one or more candidate labels of the query communication flow by at least:

determining a subset of the reference dataset having greatest similarity to the query communication flow and the features of the query communication flow using a first algorithm; and determining the candidate labels and information indicating likelihood of the candidate labels being correct by comparing the subset of the reference dataset with the query communication flow using a second algorithm requiring more computation than the first algorithm;

present output information based on the candidate labels of the query communication flow;

receive feedback responsive to presenting the output information; and update the stored reference dataset according to the feedback.

13. The network traffic analysis device of claim 12, wherein the memory further stores instructions that cause the one or more processors to:

receive reference trace data from a repository;

process the received reference trace data to extract the reference communication flows;

extract the features of the reference communication flows; and add labels to the reference communication flows based at least on the extracted features of the reference communication flows.

14. The network traffic analysis device of claim 13, wherein the labels are added to the reference communication flows by feeding the reference communication flows and the features of the reference communication flows to one or more machine learning models that produce to the labels.

15. The network traffic analysis device of claim 12, wherein the instructions to update the stored reference dataset comprises instructions to add the query communication flow, the features of the query communication flow, and one or more of the candidate labels determined to be accurate to the reference dataset.

16. The network traffic analysis device of claim 12, wherein the instructions to compare the reference dataset with the query communication flow and features of the query communication flow comprises instructions to:

operate in a non-generic mode assigning (i) a first cost for editing a dialog in a reference communication flow to match a dialog of the query communication flow, and (ii) a second cost to editing a feature of the reference communication flow to match a feature of the query communication flow, the second cost being higher than the first cost, and determining a similarity score of the reference communication flow based on the first cost and the second cost; and switch to a generic mode where the first cost is assigned to editing the feature of the reference communication flow to match the feature of the query communication flow, and the similarity score of the reference communication flow is based on the first cost.

17. A non-transitory computer-readable storage medium storing instructions thereon, the instructions when executed by one or more processors cause the one or more processors to:

store, as a reference dataset, reference communication flows, and corresponding features and labels, the labels indicating at least success or failure of communication or a type of the failure;

process network trace data in a query to generate a query communication flow by at least:

preprocessing network packets in the network trace data to extract a subset of the network packets, and correlate network packets in the subset of the network packets associated with the query communication flow, and extracting the features from the correlated network packets;

compare the reference dataset with the query communication flow and features of the query communication flow to generate one or more candidate labels of the query communication flow by at least:

determining a subset of the reference dataset having greatest similarity to the query communication flow and the features of the query communication flow using a first algorithm; and determining the candidate labels and information indicating likelihood of the candidate labels being correct by comparing the subset of the reference dataset with the query communication flow using a second algorithm requiring more computation than the first algorithm;

present output information based on the candidate labels of the query communication flow;

receive feedback responsive to presenting the output information; and update the stored reference dataset according to the feed-
back.

* * * * *